United States Patent [19]
Hirsch

[11] 3,818,683
[45] June 25, 1974

[54] WET SCRUBBER

[75] Inventor: Jack Hirsch, Far Rockaway, N.Y.

[73] Assignee: Automatic Incinerator Correction Corp., Woodside, N.Y.

[22] Filed: Nov. 24, 1972

[21] Appl. No.: 309,602

Related U.S. Application Data

[63] Continuation of Ser. No. 44,351, June 8, 1970, abandoned.

[52] U.S. Cl.................. 55/223, 55/226, 55/249, 261/118, 261/119 R
[51] Int. Cl........................................... B01d 47/02
[58] Field of Search ............ 55/249, 223, 226, 257, 55/227, 228; 261/DIG. 54, 116, 118, 119 R

[56] References Cited
UNITED STATES PATENTS

| 2,403,545 | 7/1946 | Nutting | 55/249 |
| 2,470,345 | 5/1949 | Fenn | 55/249 |
| 2,484,277 | 10/1949 | Fisher | 55/223 |
| 2,491,645 | 12/1949 | Clark et al. | 55/249 |
| 3,335,551 | 8/1967 | Golay | 55/249 |
| 3,353,336 | 11/1967 | Caballero | 55/257 |
| 3,516,647 | 6/1970 | Jaffe et al. | 55/249 |
| 3,624,696 | 11/1971 | Cohen | 261/119 R |
| 3,686,833 | 8/1972 | Rush | 261/119 R |

*Primary Examiner*—Tim R. Miles
*Assistant Examiner*—Steven H. Markowitz
*Attorney, Agent, or Firm*—Ostrolenk, Faber, Gerb & Soffen

[57] ABSTRACT

A wet scrubber for removing pollutants and other contaminating material from smoke, or other vaporous matter emitted from heaters or burning apparatus such as, for example, incinerators and for removing particulate from any air moving system.

The untreated smoke (or air) enters into the inlet opening of the scrubber housing where it is sprayed with a fine water spray. The smoke (or air) and water passes through a Venturi nozzle, causing admixing of the smoke (or air) and water upon entering the housing. Baffle plates are provided in the housing for causing the smoke (or air) to follow a tortuous, serpentine path in moving through the housing to an outlet opening which is provided with a blower means for drawing the smoke (or air) therethrough.

The water from the spray is collected in the base of the housing. The entering smoke (or air), which has been sprayed, passes beneath the first baffle plate to at least partially enter into the pool of water collected at the base of the housing and is caused to pass through a cascade of water due to a curved baffle plate which causes any contaminants or pollutant materials to be washed and removed from the smoke (or air) as it passes from the region of the bent baffle plate through the remaining baffle plate structure in exiting through the outlet opening.

6 Claims, 4 Drawing Figures

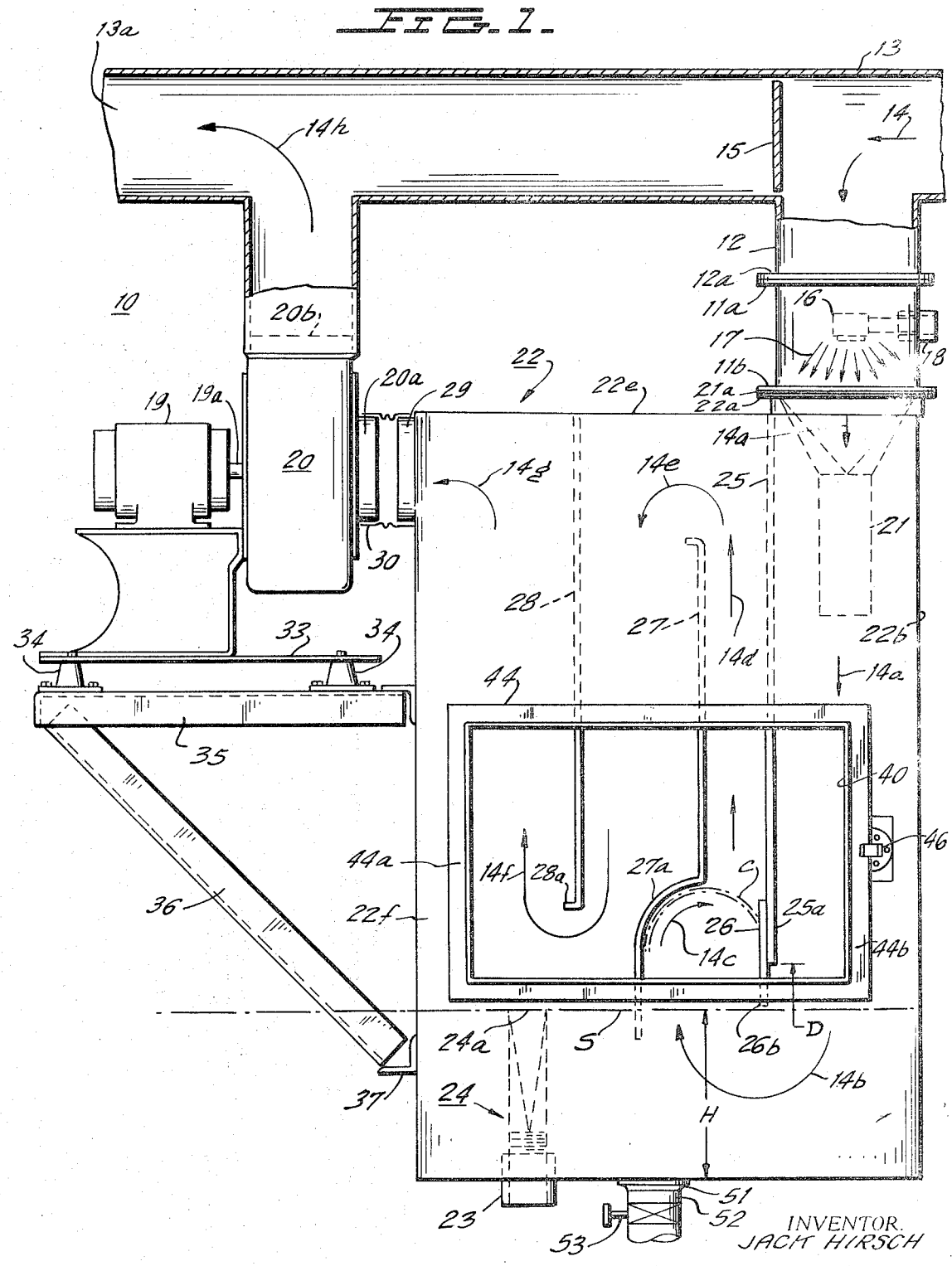

INVENTOR.
JACK HIRSCH
BY
Ostrolenk, Faber, Gerb & Soffen
ATTORNEYS

WET SCRUBBER

This is a continuation of application Ser. No. 44,351, filed June 8, 1970 and now abandoned.

The present invention relates to devices for reducing air pollution, and more particularly to a wet scrubber for removing polluting contaminants from air or vaporous matter which is emitted from heating and/or burning apparatus.

The demands imposed upon industry to reduce or eliminate air pollution are ever increasing. The present invention is characterized by providing a wet scrubber for effectively removing contaminants carried by any air moving system which contaminants may be contained within smoke or vaporous matter emitted from heating or burning apparatus, in order to remove the contaminants in a safe and rather simple manner.

The present invention is comprised of a scrubber housing having an inlet opening for receiving the flow of air from an air moving system. The contaminated air, upon entering into the inlet opening of the scrubber housing, is sprayed with a fine water spray and is then caused to enter through a Venturi nozzle, which causes further admixing of the contaminated air and water due to the increased velocity and turbulence imposed upon these components as they pass through the nozzles. The admixed components pass through the scrubber housing along a tortuous, serpentine-shaped path defined by the housing and a plurality of baffle plates arranged at spaced intervals within the housing. The first and second baffle plates define a path which guides the admixed components initially downwardly so as to enter into at least the uppermost portion of a pool of water collected at the base of the housing. The contaminated air which is drawn through the housing by suitable blower means is urged against a curved portion of a baffle plate, causing the water to form a cascade through which the contaminated air must pass before it exits from the housing, whereby the thorough admixing of the water and air causes the air to be cleaned of its polluting contaminants. Thus, the air passes through the same cascade which it forms. The air then leaves the area of the cascade where it moves upwardly and downwardly in following the aforementioned serpentine path to thereby pass through the remaining portion of the housing and outwardly through the outlet opening and blower means where it re-enters the main exit conduit before emission into the atmosphere. The emitted air is substantially free of contaminants as it exits due to the passage of the air through the cascading water.

The water collected in the base of the scrubber housing exits through a skimmer mechanism which controls the height of the water and further causes those particles which are removed from the air to be skimmed from the water surface so as to keep the water collected in the bottom of the housing substantially clean, and further so as to substantially eliminate the need for constant cleaning of the scrubber mechanism. The high velocity movement of the air within the scrubber causes circulation of the pool of water which enables the particles which are removed from the air to pass out through the skimmer regardless of whether the particles are heavier or lighter than water.

It is, therefore, one object of the present invention to provide a novel wet scrubber for removing pollutant and contaminant material from vaporous matter emitted from heating and burning apparatus or from an air moving system and/or contaminants, wherein the vaporous matter pass through a cascade of clean water or effectively remove the pollutants and contaminants therefrom.

Still another object of the present invention is to provide a novel wet scrubber for removing pollutant and contaminant material from vaporous matter emitted from heating and burning apparatus wherein the vaporous matter passes through a cascade of clean water to effectively remove the pollutants and contaminants therefrom, and which is further comprised of skimming means for constantly skimming the contaminants from a pool of water collected within the scrubber housing to maintain a clean water bath for the scrubbing operation whereby the pool of water is constantly circulated by the air moving through the scrubber to facilitate the removal of particulate in the skimmer.

These as well as other objects of the present invention will become apparent when reading the accompanying description and drawings, in which:

FIG. 1 shows an elevational view of my novel scrubber.

Figure 1A:
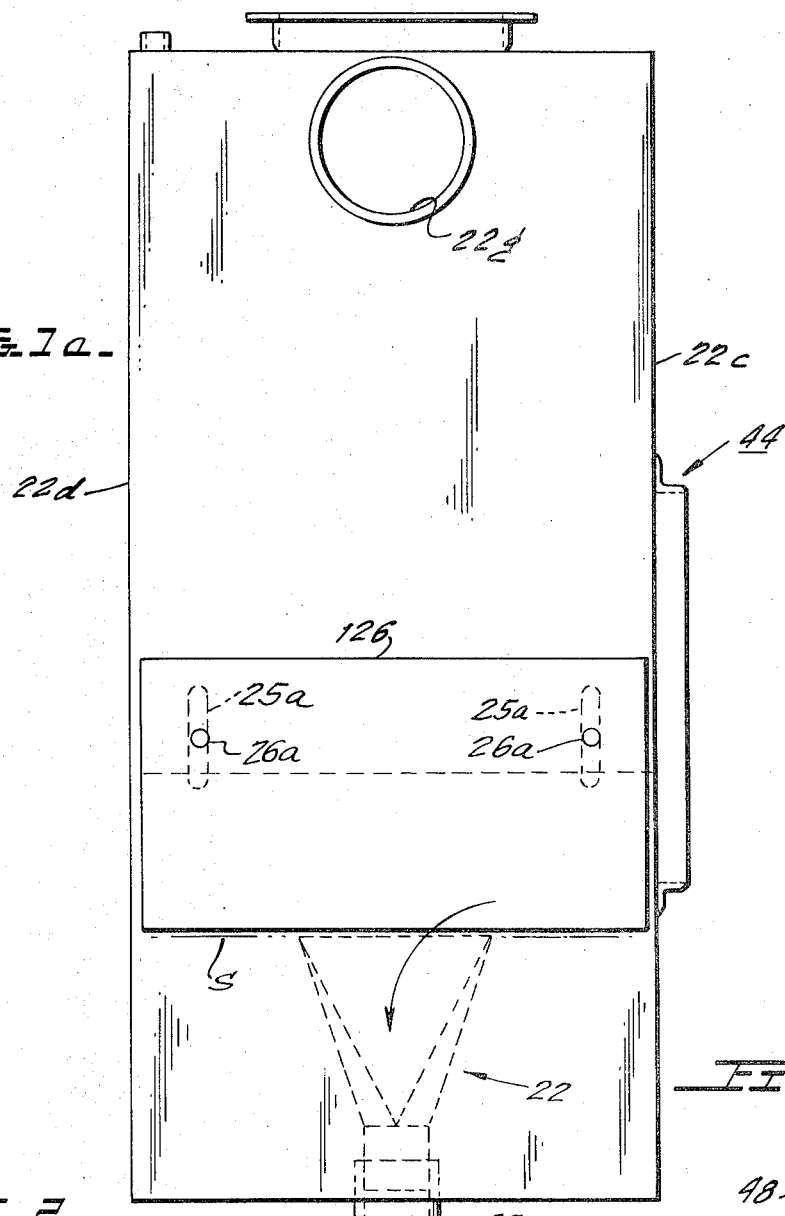
FIG. 1a is an end view of FIG. 1 looking in the direction of arrows A—A'.

The scrubber 10 of the present invention is shown in FIG. 1, and is comprised of an input conduit 11 provided with a flange 11a for coupling to the mating flange 12a of a conduit 12 which communicates with the main output conduit 13 which carries the smoke away from a heating or burning device such as, for example, an incinerator. As an obvious alternative, the scrubber may be employed to cleanse particulate from any air moving system through an arrangement of the type shown in the Figures.

The smoke normally travels in a direction shown by arrow 14 to pass through to the output end 13a of conduit 13. This path may be by-passed by means of a barrier plate 15 which may either be slidably moved into place or pivotally moved into place so as to deflect the smoke moving in the direction shown by arrow 14 into the scrubber apparatus.

A jet spray nozzle 16 is mounted within the central interior portion of conduit 11 for the purpose of providing a spray of water, as shown by the multiplicity of arrows 17, to wet the smoke and the particles carried by the smoke as they pass through conduit 11. The spray nozzle is supported by a coupling 18 which, in turn, is coupled to any suitable water supply source (not shown), the flow rate of which may be regulated by a valve (also not shown).

As will be more fully described, motor 19 operates a blower 20 which causes the smoke and particles carried thereby to pass through the scrubber mechanism. Thus, the motor operated blower 20 draws the water sprayed smoke and water sprayed particles downwardly, as shown by arrow 14a, where it passes through a Venturi nozzle 21 which increases the velocity of the water, smoke and particles carried by the smoke as it enters into the scrubber housing 22. The Venturi nozzle is provided with a flange 21a at its upper end which is sandwiched between a flange 22a provided in the opening of the scrubber housing and a flange 11b provided at the lower end of conduit 11. Suitable fastening means (not shown) are provided for securing these members to one another. The base portion of the scrubber housing 22 is made water-tight so as to be capable of collecting the water emitted from spray 16 and admixed with the smoke and the particles carried by the smoke, whereby the water is retained within the base of the scrubber housing until the surface of the collected water reaches a height H.

A skimmer assembly 24 is secured to the floor of the scrubber housing by a coupling 23 which supports the skimmer in the vertically aligned manner shown in FIGS. 1 and 1a. The skimmer 24 is a funnel-shaped member having a large opening at its upper end which tapers to a smaller opening at its lower end. The particles collected in the pool of water which are removed from the smoke and air will flow toward the skimmer 24 as a result of the circulation of the pool of the water and be removed from the system through the top end 22a of skimmer 24. The skimmer also acts to keep the pool of water relatively clean to provide good "scrubbing" action over prolonged periods of operation and further provides "self cleaning" of the scrubber apparatus by constantly removing contaminants as the water from jet spray nozzle 16 constantly fills the scrubber housing with water. The circulation of the pool of water is due to the cascading of the water to be more fully described.

The smoke, the particles carried by the smoke, and the water spray ejected by the spray nozzle 16 are guided downwardly through a hollow interior space defined by the right-hand vertical wall 22b of scrubber housing 22, the right-hand portions of the rear and front walls 22c and 22d of housing 22, and a first baffle plate 25 which is secured to the top surface 22e and the rear and side walls 22c and 22d of housing 22. Baffle plate 25 has its lower edge spaced by a distance D above the surface of the pool of water and is provided with at least a pair of elongated openings 25a, 25a which cooperate with an associated pair of openings 26a, 26a provided in a vertically adjustable baffle plate 26 for the purpose of adjusting the position of the lower edge 26b of adjustable baffle plate 26 relative to the surface of the pool of water.

Thus, the smoke, the particles carried by the smoke and the spray from nozzle 16 are carried downwardly, shown by arrows 14a, 14a, where the smoke is caused to move in close proximity to the pool of water in moving through the circuitous path of baffle plates provided within the scrubber housing. In operating the scrubber assembly, the movable baffle plate is adjusted to maintain a predetermined pressure drop. It has been found that most effective operation is in the scrubber whereby the lower edge 26b of movable baffle plate 26 is positioned closer to the surface of the pool of water when the air flow (cubic feet per minute) is decreased and is moved further away from the surface of the water when the air flow is increased.

Baffle plate 27, which is secured between the rear and front walls 22c and 22d of housing 22, has its upper end a spaced distance below the top surface 22e of housing 22 and has its bottom edge extending beneath the surface S of the pool of water in the manner shown. Baffle plate 27 is provided with a curved portion 27a which causes the smoke and the water passing beneath and around movable plate 26b to strike against the curved surface to form a cascade of water C which moves generally in the direction shown by arrow 14c. The cascading water C effectively "seals" the passageway thereby requiring the air, smoke and airborne particles to pass through the cascade, which provides excellent cleansing of the polluted smoke.

Although the water which is caused to be raised up to the region of the curved baffle plate portion 27a will not rise above this point, the cleansed smoke is caused to be drawn upwardly due to the strong pulling power of motor driven blower 20, whereby the smoke follows the path shown by arrows 14d and 14e. The flow reversal of the smoke in the region shown by arrow 14e is caused by a third baffle plate 28 which is joined to the top surface 22e and the rear and front walls 22c and 22d of housing 22. The lower edge 28a of baffle plate 28 lies well above the surface S of the pool of water. The relative spacing between the baffle plates regulates the velocity of the exiting air and smoke.

The "scrubbed" smoke moves downwardly beneath the lower edge of baffle plate 28 and experiences another flow reversal, as shown by arrow 14f. The "scrubbed" smoke moves upwardly and experiences another flow reversal, as shown by arrow 14g, whereby the smoke is caused to exit through an opening 22g provided in side wall 22f. Opening 22g is provided with a flange 29 which is in alignment with the flange 20a provided in blower 20. A cylindrical-shaped asbestos conduit 30 couples the output opening 22g through housing 22 with the input opening of blower 20 to prevent the escape of any smoke in passing from housing 22 into blower 20. Blower 20 drives the "scrubbed" smoke through its output opening 20b, whereby the "scrubbed" smoke enters into a conduit 31 communicating with the main conduit 13 of the incinerator apparatus to enable the "scrubbed" smoke to move in the direction shown by arrow 14h and enter into the atmosphere.

The additional baffle plate 28 provided in the scrubber housing 22 causes any particles which may have passed above the upper edge of baffle plate 27 to be deposited in the pool of water as the smoke passes beneath the lower edge of baffle plate 28.

Motor 19 is fastened to a supporting stand 32 which has its base secured to a support plate 33. The support plate is mounted upon a plurality of resilient members 34 provided for eliminating vibration. The resilient members 34 are, in turn, supported upon a pair of angle arms 35 (only one of which is shown in FIG. 1). Inclined supporting ribs in the form of a pair of angle arms 36 (only one of which is shown in FIG. 1) in turn support the cantilevered support plates 35. The lower ends of the diagonally aligned supporting members 36 are secured to a horizontally aligned angle arm 37 which is secured to the side wall 22f of the scrubber housing 22.

The output shaft 19a of motor 19 is mechanically coupled (by means not shown) to the blower vanes (not shown), enabling the blower to impart a pulling force upon the smoke, water and particles to urge these components to follow the circuitous path between and around the baffle plates provided within the housing.

Figure 2A:
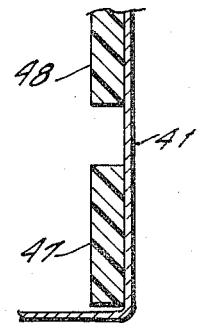
FIG. 2a shows a sectional view of a portion of the door of FIG. 2 looking in the direction of arrows B—B'.
Figure 2:
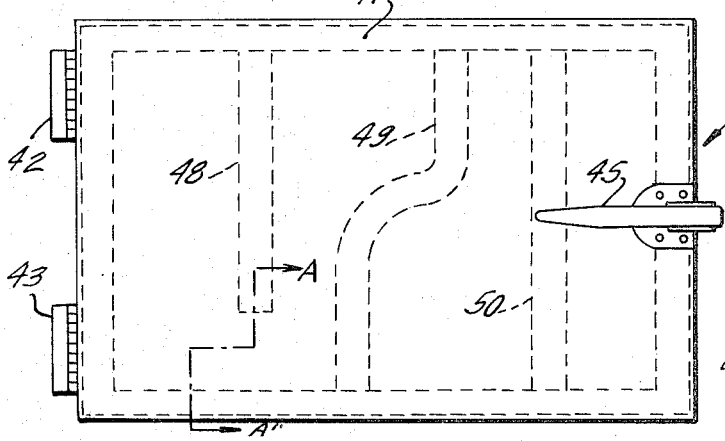
FIG. 2 is an elevational view showing the scrubber door in detail.

Adjustment of the movable plate 26 and any maintenance or inspection of the interior of scrubber housing 22 is provided for by means of the rectangular-shaped opening 40 provided within front wall 22d of the scrubber housing. Access to the interior of scrubber housing 22 through opening 40 is provided for by the hingedly mounted door assembly 41, shown best in FIGS. 2 and 2a. Door 41 is provided with a pair of hinges 42 and 43 which are secured by any suitable fastening means to frame portion 44 of opening 40. The right-hand edge of door 41 is provided with a manually operable handle 45 having a latching member (not shown) which cooperates with a mating latching member 46 secured adjacent to the right-hand frame portion 44a of opening 40. The interior surface of door 41 is provided with a recnating matter suspended therein through said inlet opening so as to pass through said housing and said outlet opening;

means for spraying said matter with a fine water spray as it enters the inlet opening;

the base of said housing formed by said sidewalls and bottom end being adapted to collect said water;

a plurality of vertically aligned baffle plates mounted in spaced parallel fashion within said housing to guide said matter through a tortuous serpentine ing intermediate said sidewalls for draining the water collected therein;

skimmer means having an upper opening positioned above the floor of said housing and a lower opening joined to said third opening, said skimmer means being a substantially tapered tubular shaped member having sidewalls tapering inwardly and downwardly from said upper opening toward said lower opening;

said lower opening being smaller than said upper opening;

said skimmer means permitting the water to drain from said housing only when the water in the region of the skimmer means upper opening surpasses the level of said upper opening whereby particles collected in said water which are removed from the entering matter and deposited upon the surface of the water collected in said housing are skimmed from the water flowing into the upper opening of the skimmer as a result of the constant circulation of the pool of water collected in the housing due to the cascading action of the water.

4. The scrubber of claim 1 wherein the first baffle plate is positioned closest to said inlet opening and has its lower edge positioned above the surface of the water;

a movable plate and mounting means for adjustably mounting said movable plate to the first baffle plate closest to said inlet opening for positioning the lower edge thereof between an uppermost position above the surface of the water and a lowermost position beneath the surface of the water to assure contact between the cascading curtain of water and the aforesaid adjacent first baffle plate regardless of the pressure level in the scrubber.

5. The scrubber of claim 4 wherein said second baffle plate is positioned adjacent the first baffle plate having said movable mounting plate;

said curved portion comprising a substantially flat lower end which is aligned parallel to and remote from said movable plate being joined to a substantially flat upper end, which is parallel and closer to said movable plate than said lower end, by a curvilinear portion having an arcuate-shaped configuration.

6. The scrubber of claim 4 wherein said second baffle plate is positioned adjacent the first baffle plate having said movable mounting plate;

said curved portion comprising a lower end which is aligned parallel to and remote from said movable plate being joined to an upper end, which is parallel and closer to said movable plate than said lower end, by an intermediate portion aligned transverse to said upper and lower ends.

* * * * *